Nov. 11, 1958 M. RIGERT 2,860,207
CIRCUIT INTERRUPTER TRIPPING RELAY
Filed Nov. 23, 1956 2 Sheets-Sheet 1

INVENTOR.
MAX RIGERT
BY Ralph G. Hohenfeldt
ATTORNEY

Nov. 11, 1958

M. RIGERT 2,860,207

CIRCUIT INTERRUPTER TRIPPING RELAY

Filed Nov. 23, 1956

INVENTOR.
MAX RIGERT
BY
Ralph G. Hohenfeldt
ATTORNEY

United States Patent Office 2,860,207
Patented Nov. 11, 1958

2,860,207

CIRCUIT INTERRUPTER TRIPPING RELAY

Max Rigert, West Allis, Wis., assignor to McGraw-Edison Company, a corporation of Delaware Application November 23, 1956, Serial No. 624,060

5 Claims. (Cl. 200—109)

This invention pertains to circuit interrupters in general, and in particular to an improvement in fault current responsive tripping means therefor.

The invention is directed primarily to a tripping device which responds to flow of fault current between a power line and ground, commonly designated a ground fault relay. The invention will be described in relation to a repeating polyphase circuit interrupter such as that disclosed in the copending application of A. Van Ryan et al., Serial No. 382,365, filed September 25, 1953, now Patent No. 2,810,038, issued October 15, 1957, and assigned to the instant assignee.

The cited application describes a circuit interrupter which has a main interrupting contact for each phase. All contacts are carried on a common power bar for executing a plurality of simultaneous opening and reclosing operations which terminate in lockout. The interrupter is opened, following occurrence of a fault, by energy derived from a spring normally restrained in extended position by means of a toggle link arrangement controlled by a tripping latch. Reclosing of the contacts is achieved by a shunt electromagnet which delivers energy to the opening spring while closing the contacts. Each contact has in series with it an overload relay adapted to respond to the flow of fault current in the individual phases by acting on a common trip bar which transmits force from any or all of the relays to the toggle latch. When the toggle is broken, the opening springs are able to open all contacts rapidly and simultaneously.

The interrupter described in the copending application is also provided with a ground fault relay adapted to act upon the common trip bar in a manner similar to the series overload relays. The ground fault relay, like the series overload relays, executes a number of rapid operations followed by retarded operations. The instant case eliminates any retardation of the ground fault relay by omitting the fluid dashpot shown in the prior application. Electrical impulses for operating the ground fault relay are derived in the copending application and in the present application from current transformers having their primaries connected in the power lines being protected and their secondaries connected in parallel so that the vector sum of their secondary currents adds to zero under normal conditions. The ground fault relay coil is connected in parallel with the secondaries so that if a fault occurs between any power line and ground, an unbalance current will be derived which energizes the ground fault trip coil and operates the relay to trip open the interrupter.

The improvements in the ground fault relay forming the subject of the instant invention are applicable to the interrupter just briefly described but they are also broadly applicable to circuit breakers in general.

Although the ground fault relay illustrated in the copending application operates satisfactorily and even ideally for ground faults normally encountered in distribution circuits, there are times when greater sensitivity is required than that obtainable with the prior art design.

In certain distribution systems it is imperative that the interrupter be opened quickly upon occurrence of low magnitude ground faults. For example, in the remote arid regions of the country a large magnitude ground fault, which is not cleared immediately, is apt to start brush or grass fires due to the violent arcing associated with a wire being down.

The present invention has as its principal object the satisfaction of the requirement that a self-contained circuit interrupter be provided with a ground fault tripping means that is responsive to the flow of fault current of lesser magnitude than those heretofore obtainable.

Another object of this invention is to provide a ground fault relay with low inertia and low frictional losses so that its input signal may be of lower energy value and so that its sensitivity to faults may be increased.

It is a general object to provide an improved fault current relay.

A more detailed explanation of the invention will now be set forth in connection with the drawings in which.

Figure 3:
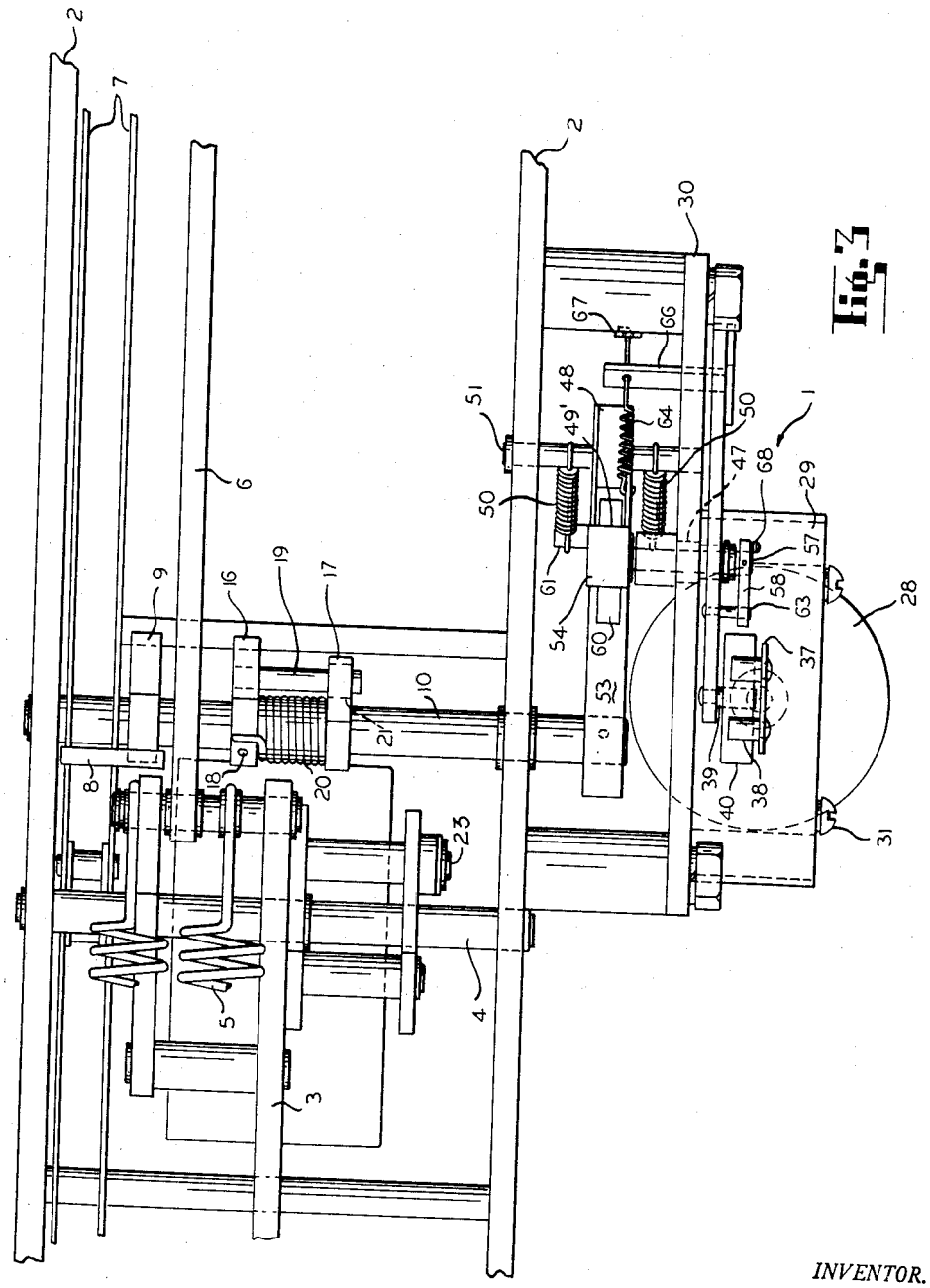

In reference to Figs. 1 and 3 and before entering into a detailed discussion of the invention, a brief outline will be made of the essential features of a circuit interrupter to which the novel ground fault relay will be applied.

The ground fault relay assembly is designated generally by the reference numeral 1 and is shown mounted on a broken away portion of a side wall 2 constituting part of a U-shaped chassis upon which the circuit interrupter mechanism is supported. The main contacts of the interrupter, not shown, are carried on individual bell cranks such as 3 supported for rotation on a cross shaft 4 journalled in opposite walls 2 of the chassis. The depicted position of these parts is such as to correspond with closed circuit position of the interrupter; whereas, if the interrupter were open, bell crank 3 would be rotated through a counterclockwise angle from its position in Fig. 1. Counterclockwise rotation of bell crank 3, and accordingly, opening of the interrupter is accomplished by rendering stored energy springs 5 effective. When the interrupter is closed, springs 5 are extended to the right and held in that position by a power bar 6 which also has attached to it bell cranks such as 3 for supporting the main contacts of the other phases. Opening springs 5 are maintained in extended condition through engagement of the power bar 6 by a toggle type of trip latch, not shown. For present purposes, it is sufficient to know that when the toggle is collapsed, springs 5 may contract and rotate the bell cranks 3 counterclockwise as described earlier.

The power bar toggle latch means are tripped by lateral movement of a trip bar 7 comprising two parallel thin metal strips. Trip bar 7 is moved to the left for the purpose of breaking the main toggle latch by individual or joint action of the series overload means, not shown, or by the novel ground fault relay. Trip bar 7 is biased to the right when viewed in the drawings.

It will be seen that trip bar 7 carries a transverse pin 8 which may be struck and driven by counterclockwise rotation of a short lever 9. Lever 9 is pinned on a shaft 10 which is journalled in the walls 2 of the chassis. One end of shaft 10 extends beyond the chassis wall 2 into connection with the ground fault relay assembly 1. Counterclockwise rotation of shaft 10 causes a corresponding rotation of lever 9 and the latter strikes pin 8 and moves trip bar 2 to the left for effecting release of power bar 6 so that springs 5 may open the interrupter. Such rotation of shaft 10 will occur whenever the novel relay 1 responds to a ground fault. In fact, the interrupter will open and reclose successively until the ground fault is cleared or the interrupter locks out.

In order to reset shaft 10 in its depicted angular position following an opening of the interrupter, a pair of resetting levers 16 and 17 are located near the center of shaft 10. Lever 16 is fixedly pinned to the shaft at 18 and interconnected with the adjacent lever 17 by means of a cross pin 19 and a torsion spring 20. Lever 17 is loosely supported on the shaft 10 but is held at a fixed angle with respect to its mating lever 16 by means of the cross pin 19 residing in an oversized hole 21 in the swinging end of lever 17. It will be evident from the construction that these two levers 16, 17 are in lost motion connection with each other through the medium of pin 19 extending loosely into hole 21. If a rotational force is suddenly applied to arm 17 the same force will be cushioned by its transmission through spring 20 whereupon shaft 10 will be rotated. The free play between pin 19 and hole 21 then allows back lash which facilitates latching of the fault responsive relays 1.

The double lever resetting arrangement just described is actuated by an arm 22 extending from bell crank 3. When shaft 10 rotates to cause lateral movement of trip bar 7 for tripping the interrupter open, resetting levers 16, 17 also rotate counterclockwise through a relatively small angle and stay in that position for an instant. A moment later rotation of bell crank 3 under influence of opening springs 5 causes arm 22 to swing around until its cross pin 23 strikes the resetting lever 17 so as to return shaft 10 to its normal angular position as illustrated in the drawings. Thus, resetting of shaft 10 occurs even before the main interrupter contacts have been reset to closed position or before the power bar 6 has been restored to the position shown in the drawing.

It will be clear from discussion hereinafter that resetting of shaft 10 to its normal angular position is equivalent to resetting of the ground fault relay following its response to the flow of fault current.

Figures 1, 2:
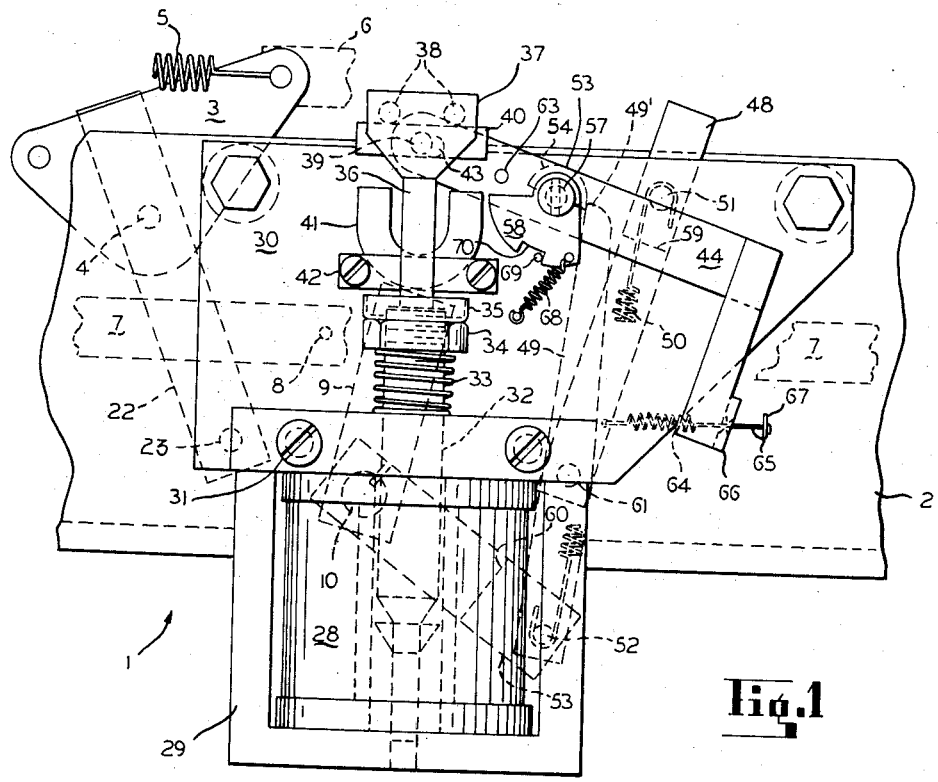
Fig. 1 is a front elevational view of the novel ground fault relay assembly in conjunction with parts of a circuit interrupter.
Fig. 2 is a diagram illustrating the connections of a ground fault protective circuit; and, Fig. 3 is a plan view of the invention looking downwardly on Fig. 1.

Attention is now invited to Fig. 2 which shows the electrical circuit associated with ground fault protection. There are three power lines 26 each of which has a current transformer 27 in circuit. The secondaries of the current transformers are all connected in parallel with the operating electromagnet coil 28 of the ground fault relay assembly 1. Under normal circuit conditions the vector sum of the secondary currents equals zero so that no current flows through coil 28. In the event of a fault, however, such as that between point F, where line 26 is inadvertently grounded, and the ground connection G of the system, an unbalanced condition will prevail in the current transformer secondaries which will manifest itself through energization of coil 28 and result in operation of the ground fault tripping relay. It will be understood that the turns ratio of the transformers is such that only a small proportion of a ground fault current will appear in relay coil 28. As stated earlier, it is an object of the invention to effect tripping of the ground fault relay for lower values of fault current between the high voltage line and ground than was heretofore possible.

The ground fault relay 1 includes coil 28 which is surrounded by a magnetic structure in the form of frame 29 attached to a mounting plate 30 by means of screws 31. The electromagnetic structure is adapted to attract a solenoid plunger 32 downwardly whenever coil 28 is sufficiently energized by flow of ground fault current.

Plunger 32 is surrounded by a light plunger return coil spring 33. An adjusting nut 34 is provided for establishing the elevation of plunger 32 with respect to the magnetic center of coil 28 and nut 34 is in turn secured against inadvertent rotation by a jam nut 35 also threadably attached to plunger 32.

Plunger 32 has an extension 36 to which is attached a trapezoidal shaped plate 37 having a pair of pins 38 projecting from one side thereof. Immediately below pins 38 there is a pivot pin 39 which supports a soft iron armature 40. Pins 38 hold armature 40 level.

Under normal conditions, soft iron armature 40 is held out of the range of the magnetic influence exerted by a U-shaped permanent magnet 41 which is supported in a clamp 42 in vertical alignment with armature 40. Since the attraction of armature 40 by the permanent magnet 41 varies as the square of the distance between them, it will be evident that a slight movement of the armature toward the magnet will cause the former to be brought into magnetic range and attracted very rapidly to the permanent magnet. Consequently, a very small energization of coil 28 is sufficient to draw plunger 32 downwardly and when plunger movement has commenced, the permanent magnet takes over to do useful work. Obviously, either the permanent magnet or armature may be made movable.

Attached to pin 39 by means of a slotted hole 43 is a counterbalanced L-shaped lever 44 rotatably mounted on the outer periphery of a shoulder bushing 47 press-fit through an appropriate hole in mounting plate 30. L-shaped lever 44 is carefully counterbalanced along with other components attached to it so that the lever 44 has substantially no rotational moment about the axis of bushing 47. It is evident therefore, that plunger 32, armature 40 and lever 44 are very near being balanced against rotation when coil 28 is de-energized. A small counterbalancing force is provided by plunger return spring 33.

Downward movement of plunger 32, in response to energization of coil 28, effects tripping of the interrupter through the agency of a toggle link mechanism consisting primarily in a pair of pivotally joined links 48 and 49. Links 48, 49 are biased toward collapsing to the left, as viewed in Fig. 1, by a tension spring 50 extending between a fixed pivot pin 51 and a swinging pivot 52 carried by a trip crank arm 53. When the toggle is made, links 48 and 49 are prevented from collapsing under the influence of spring 50 by reason of the tip 49' of link 49 bearing against the outer periphery of a partially rotatable semi-cylindrical latch member 54. Latch member 54 is fixed on a shaft 57 which extends through bushing 47 for supporting at its outer end a sector shaped latch release lever 58. The tip 49' of link 49 bears very lightly against the outer periphery of latch member 53 and it is evident that rotation of trip sector 58 will cause a corresponding rotation of the latch member and allow the tip 49' to move past the flat side of the semi-cylindrical latch to thereby permit collapse of the toggle.

It will be observed that link 48 is longitudinally slotted to a depth terminating at 59 and that the same is true of crank arm 53 whose slot terminates at 60. Thus, the links 48, 49 constituting the toggle link mechanism, and crank arm 53, are able to swing in alignment with each other on their joining pin 61. When the toggle link mechanism just described collapses, spring 50 exerts a rotational influence on toggle crank arm 53 so that main trip shaft 10 is rotated in a counterclockwise direction as described earlier. Upon this event trip arm 9 strikes pin 8 and causes tripping of the interrupter by shifting trip bar 7 to the left.

In order to trip the ground fault relay toggle mechanism, L-shaped balance lever 44 has a latch release pin 63 extending from it into the path of sector shaped latch release lever 58. Under normal conditions release pin 63 is spaced angularly with respect to the upper radial edge of the sector 58 so that L-shaped arm 44 must move through a considerable angle before release pin 63 strikes the latch release sector 58. When pin 63 finally impacts the sector it causes sudden rotation of semi-cylindrical latch 53 and release of latch finger tip 49' so that toggle links 48, 49 may collapse and open the interrupter as described earlier.

Because latch release pin 63 is spaced from sector shaped latch release lever 58, none of the energy derived from coil 28 is expended on tripping semi-cylindrical latch 53 when plunger 32 begins its downward movement. In fact, very little energy need be derived for any purpose from the ground fault current flowing through coil 28 since the elements attached to the plunger 32 are counterbalanced. However, when downward plunger movement has begun, the armature 40 is suddenly attracted to magnet 41 so that release pin 63 is caused to impact release lever 58 and the semi-cylindrical latch 53 is thereby rotated by energy derived partly from coil 28 but principally from the permanent magnet 41. This is an important feature of the invention since it nullifies or reduces to insignificance all frictional forces in the relay 1 assembly except the very slight friction which occurs between toggle finger tip 49' and the smooth periphery of semi-cylindrical latch 53.

When the toggle links 48 and 49 collapse, and before they are reset, L-shaped lever 44 and armature 40 are separated from permanent magnet 41. This is accomplished by means of a return spring 64 attached at one end to link 44 with its other straight end 65 extending freely through an apertured pad 66 in the L-shaped arm and terminating in a stop button 67. Thus when the toggle links collapse, a clockwise force is imparted to L-shaped lever 44 through the agency of spring 64 and the soft iron armature 40 is thereby separated from the permanent magnet 41.

After the semi-cylindrical latch 53 has turned and tripped the toggle, latch 53 is returned to the angular position in which it is shown in Fig. 1 by means of a small coil spring 68 fixed at one end and attached at the other to the sector 58. Rotational movement of the latch 53 is limited by a stop pin 69 residing in a peripheral notch 70 in the sector in a manner which is evident from inspection of the drawings.

From the aforegoing description it will be seen that a ground fault relay has been disclosed which is inherently sensitive and which derives its latch tripping force from a permanent magnet after tripping movement is initiated by an electromagnet. Any comparable arrangement involving upsetting the equilibrium of a mechanical system by an electromagnet for the purpose of deriving useful work from permanent magnets for tripping a circuit interrupter is embraced by the invention. It will be noted further that the ground fault relay assembly here disclosed is ineffective to break the toggle until the relay current reaches a sharply critical value at which time sudden attraction by the permanent magnets occurs and the release lever is impacted sharply. This allows for precise setting of the relay assembly to trip at any desired current value.

Although a preferred form of the invention has been described in detail, it will be understood that the invention may take different forms now apparent to those versed in the art. Therefore, the disclosure is intended to be suggestive rather than limiting and it is to be construed by interpretation of the claims which follow.

It is claimed:

1. Tripping relay means for a circuit interrupter, said means comprising a magnet coil and plunger means attractable thereto, a permanent magnet member and a magnetizable member normally spaced from each other but movable within effective magnetic range of each other by movement of said plunger means, lever means connected to said plunger means and operably supporting one of said members, latch means, a toggle link mechanism biased toward collapsed position and normally held in rigid condition by said latch means, release means movable with said lever means through an angle of lost motion with respect to said latch means while said plunger is under an initial magnetic influence due to said magnet coil being traversed by a fault current of predetermined magnitude, said release means being adapted to impact and trip said latch means following the added magnetic influence due to attraction of said members toward each other, whereby said toggle mechanism can collapse for imparting a tripping force to said interrupter.

2. Tripping relay means for a circuit interrupter, said means comprising a magnet coil and a plunger means attractable thereto when the coil is energized by a predetermined minimum current, a permanent magnet member and a magnetizable member normally in spaced relation from each other but movable within effective range of magnetic attraction for each other by slight initial movement of said plunger due to energization of said coil, lever means connected to said plunger means and supporting one of said members in said spaced relation from the other, said lever being substantially balanced about its axis of rotation, rotatable latch means, a toggle link mechanism biased toward collapsing and normally held in rigid condition by said latch means, latch release means in spaced relation with said latch means and movable with said lever to impact said latch means and rotate the same when the balance of the lever means is overcome following initial movement of said plunger and sudden attraction between said members, whereby said toggle link mechanism is released from said latch by force derived from attraction of said members and said interrupter is tripped by collapse of said toggle mechanism.

3. Tripping relay means for a circuit interrupter, said means comprising a magnet coil and plunger means attractable thereto, a permanent magnet member and a magnetizable member normally in spaced relation from each other but movable within effective range of each other by initial attraction of said plunger means in one direction, lever means connected to said plunger means and supporting one of said members in said spaced relation, latch means, a toggle link mechanism biased toward collapsing and normally held in rigid condition by said latch means, release means normally in spaced relation with said latch means and slowly movable with said lever means, said release means being adapted to impact and trip said latch means following sudden attraction of said members toward each other whereby said toggle may collapse for imparting a tripping force to said interrupter, and a lost motion connection between said lever and said toggle mechanism wherein the lost motion is taken up when the toggle collapses, said lost motion connection thereby effecting separation of said magnetic and magnetizable members through the agency of said lever means.

4. Tripping means for a circuit interrupter, said tripping means comprising a magnet coil and plunger means attractable thereto, spring means biasing said plunger toward unattracted position, a permanent magnet member and a magnetizable member, one of said members being supported by said plunger means normally in spaced relation with the other and movable within range of mutual magnetic interaction with each other by slight initial movement of said plunger, rotatable latch means, latch release means including pin means attached for movement with said plunger means, said pin means being normally spaced from and adapted to impact the latch means by sudden attraction of the members after the plunger moves one member nearer the other, and interrupter tripping means responsive to operation of said latch.

5. A ground fault responsive relay means for a circuit interrupter, said relay means comprising a magnet coil energizable by fault current of predetermined magnitude, a plunger attractable in said coil, a permanent magnet, an armature carried by the plunger in spaced relation to the permanent magnet, a pivotal lever attached to and substantially counterbalancing the weight of the plunger, a semi-cylindrical latch including a latch release arm mounted for rotation independently of said lever, a latch release pin means normally spaced from said latch release arm and movable with said plunger when said coil initiates movement of the plunger, said release pin moving rapidly and impacting said release arm and rotating said semi-cylindrical latch when said armature is attracted to said permanent magnet, biased toggle mechanism releasable by rotation of said latch to effect tripping of said interrupter, means responsive to opening said interrupter for resetting said toggle mechanism, and means for separating said armature from the permanent magnet after said toggle has been released.

References Cited in the file of this patent

UNITED STATES PATENTS

| | | |
|---|---|---|
| 620,930 | Johnston | Mar. 14, 1899 |
| 2,537,618 | Bourne | Jan. 9, 1951 |
| 2,641,664 | Knutson | June 9, 1953 |
| 2,727,108 | Chisholm | Dec. 13, 1955 |
| 2,761,093 | Thumim | Aug. 28, 1956 |